(12) United States Patent
Ishii et al.

(10) Patent No.: US 9,310,220 B2
(45) Date of Patent: Apr. 12, 2016

(54) ONBOARD DISPLAY DEVICE

(71) Applicant: Fuji Jukogyo Kabushiki Kaisha, Tokyo (JP)

(72) Inventors: Mitsunori Ishii, Tokyo (JP); Masato Sakurai, Tokyo (JP); Tetsuo Kobayashi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/457,443

(22) Filed: Aug. 12, 2014

(65) Prior Publication Data
US 2015/0057916 A1    Feb. 26, 2015

(30) Foreign Application Priority Data
Aug. 21, 2013  (JP) .................. 2013-171172

(51) Int. Cl.
  *G01C 22/00* (2006.01)
  *G01C 21/36* (2006.01)
  *G01C 21/34* (2006.01)
(52) U.S. Cl.
  CPC ........ *G01C 21/3697* (2013.01); *G01C 21/3469* (2013.01)
(58) Field of Classification Search
  CPC ............ G01C 21/3469; G01C 21/3697; Y10S 903/903
  USPC .................. 701/22, 123, 34.4, 400, 408, 423; 180/65.275; 903/902; 340/988, 995.1, 340/995.14, 995.27, 425.5, 438, 455
  See application file for complete search history.

(56) References Cited

U.S. PATENT DOCUMENTS

| 5,539,399 | A  | * | 7/1996 | Takahira et al. | ......... 340/995.27 |
| 5,686,895 | A  | * | 11/1997 | Nakai et al. | ................ 340/636.1 |
| 8,521,408 | B2 | * | 8/2013 | Cho et al. | ....................... 701/123 |
| 9,008,874 | B2 | * | 4/2015 | Wippler | .......................... 701/22 |

FOREIGN PATENT DOCUMENTS

| JP | 2012-205470 | 10/2012 |
| JP | 2012-222876 | 11/2012 |

* cited by examiner

*Primary Examiner* — Dalena Tran
(74) *Attorney, Agent, or Firm* — Troutman Sanders LLP

(57) ABSTRACT

A minimum remaining driving range estimated to be the distance which the vehicle can travel on the remaining battery power, in a case where a power load which accessories capable of receiving electric power from a battery place on the battery is the greatest within a variable range in accordance with input of operations, and a maximum remaining driving range estimated to be the distance which the vehicle can travel on the remaining battery power, in a case where the power load is the smallest within the variable range, are displayed on a display unit.

8 Claims, 4 Drawing Sheets

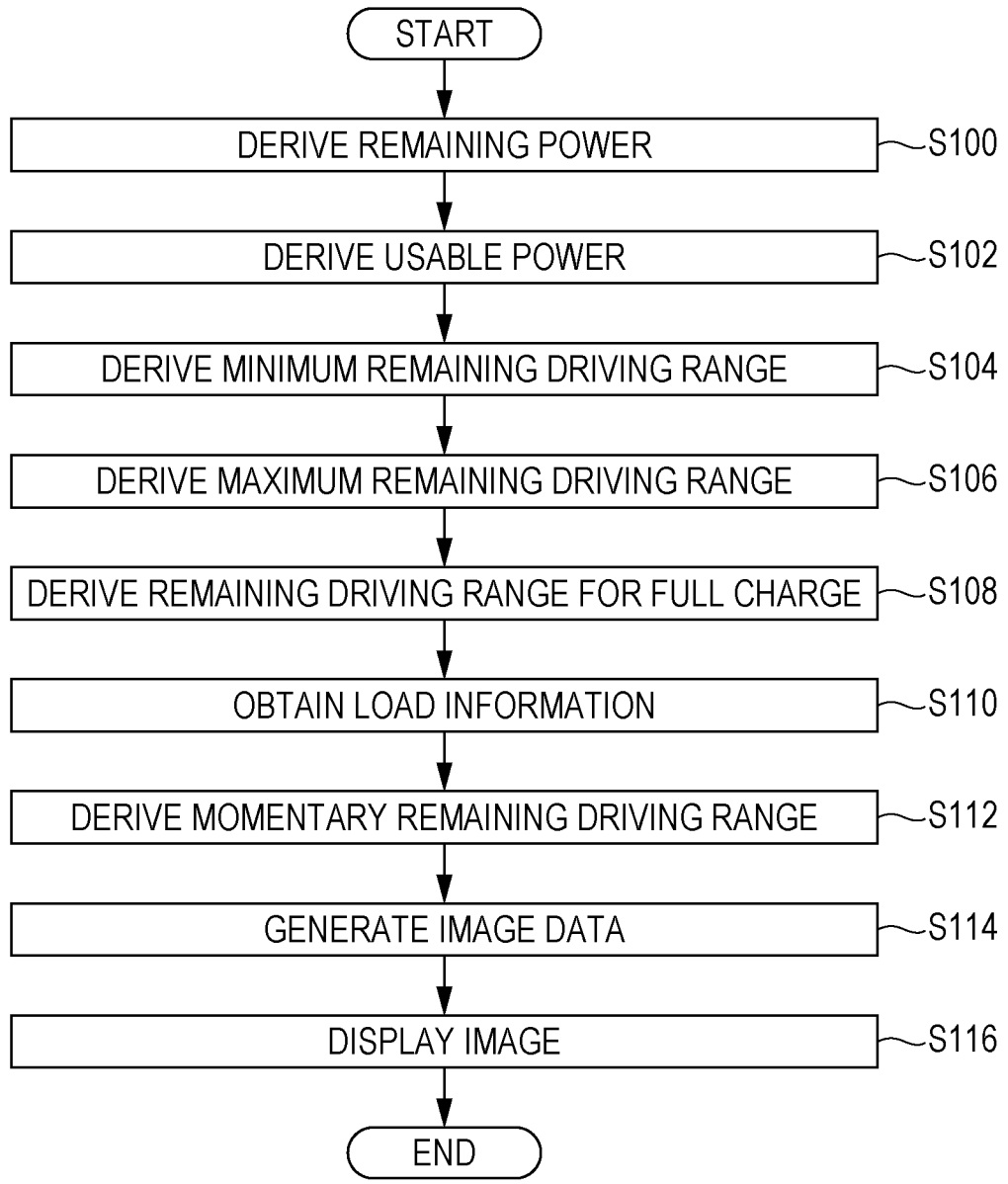

ONBOARD DISPLAY DEVICE

CROSS-REFERENCE TO RELATED APPLICATIONS

The present application claims priority from Japanese Patent Application No. 2013-171172 filed on Aug. 21, 2013, the entire contents of which are hereby incorporated by reference.

BACKGROUND

1. Technical Field

The present invention relates to an onboard display device which derives and displays a remaining driving range which is an estimation of how far a vehicle can travel on the remaining electric power in the battery.

2. Related Art

As of recent, electric vehicles, which have batteries that drive an electric motor which powers the vehicle, are becoming commonplace. Japanese Unexamined Patent Application Publication (JP-A) No. 2012-222876 and Japanese Unexamined Patent Application Publication (JP-A) No. 2012-205470 propose a technology to derive a remaining driving range which is an estimation of how far such a vehicle can travel on the remaining electric power in the battery, and display this on a display unit such as an onboard display or the like.

JP-A No. 2012-222876 describes a technology in which an integrated value of power consumption is learned every predetermined period, a remaining driving range is derived based on the learning history, and displayed on a display unit. This technology involves separate learning of power consumed by the driving motor and power consumed by other than the driving motor. Accordingly, if the power to an accessory such as the air conditioner is turned off, the effects of that accessory are subtracted, and an appropriate remaining driving range at that point is immediately derived. JP-A No. 2012-205470 discloses a technology in which a standard remaining driving range in a case of the usage state of the accessories being in a standard state, and a full-load remaining driving range estimated in a case of the usage state of the accessories being in a full-load state, are displayed together on the display unit.

In the technology according to JP-A No. 2012-222876 described above, each time the usage state of accessories changes, such as the air conditioner being turned on and off, the remaining driving range is changed, which means that the display of remaining driving range frequently changes. This may seem annoying to the occupants of the vehicle. Moreover, the occupants cannot tell how much a full load of accessories, such as turning the air conditioner on full power, will shorten the remaining driving range, without actually trying by operating the accessories in that way.

In the technology according to JP-A No. 2012-205470, the standard remaining driving range and full-load remaining driving range are both displayed. However, the occupants cannot tell how much a minimum load of accessories, such as turning the air conditioner off to minimize electric power consumption, will extend the remaining driving range, without actually trying by operating the accessories in that way.

SUMMARY OF THE INVENTION

Accordingly, it is an object of the present invention to provide a onboard display device which does away with the annoyance of the remaining driving range changing each time the power consumption of the accessories changes, and enables desired remaining driving ranges to be easily comprehended all at once.

An aspect of the present invention provides an onboard display device that displays, on a display unit within a vehicle, a remaining driving range, which is an estimated distance of how far the vehicle can travel by being driven by an electrical motor which operates under electrical power from a battery, without replenishing electric power to the battery from outside of the vehicle. The onboard display device includes a remaining power obtaining unit that obtains remaining power which is electric power stored in the battery; a distance deriving unit that derives a minimum remaining driving range estimated to be the distance which the vehicle can travel on the remaining battery power, in a case where a power load which accessories capable of receiving electric power from the battery place on the battery is the greatest within a variable range in accordance with input of operations, and a maximum remaining driving range estimated to be the distance which the vehicle can travel on the remaining battery power, in a case where the power load is the smallest within the variable range; and a display control unit that displays the minimum remaining driving range and the maximum remaining driving range on the display unit.

The display control unit may display each of the maximum remaining driving range and minimum remaining driving range on the display unit in the form of shapes which are visually recognizable by comparing relative length thereof.

The distance deriving unit may derive a remaining driving range for full charge estimated to be the distance which the vehicle can travel on the remaining power when the battery is fully charged and power load is minimal. The display control unit may further display the remaining driving range for full charge on the display unit.

The onboard display device may further include a load obtaining unit that obtains load information indicating magnitude of the power load according to operation input at that point-in-time. The distance deriving unit may derive a momentary remaining driving range estimated to be the distance which the vehicle can travel on the remaining power under the power load indicated by the load information. The display control unit may further display the momentary remaining driving range on the display unit.

BRIEF DESCRIPTION OF THE DRAWINGS

FIG. 2 is a flowchart illustrating the flow of remaining driving range derivation-and-display processing;

DETAILED DESCRIPTION

Figure 1:
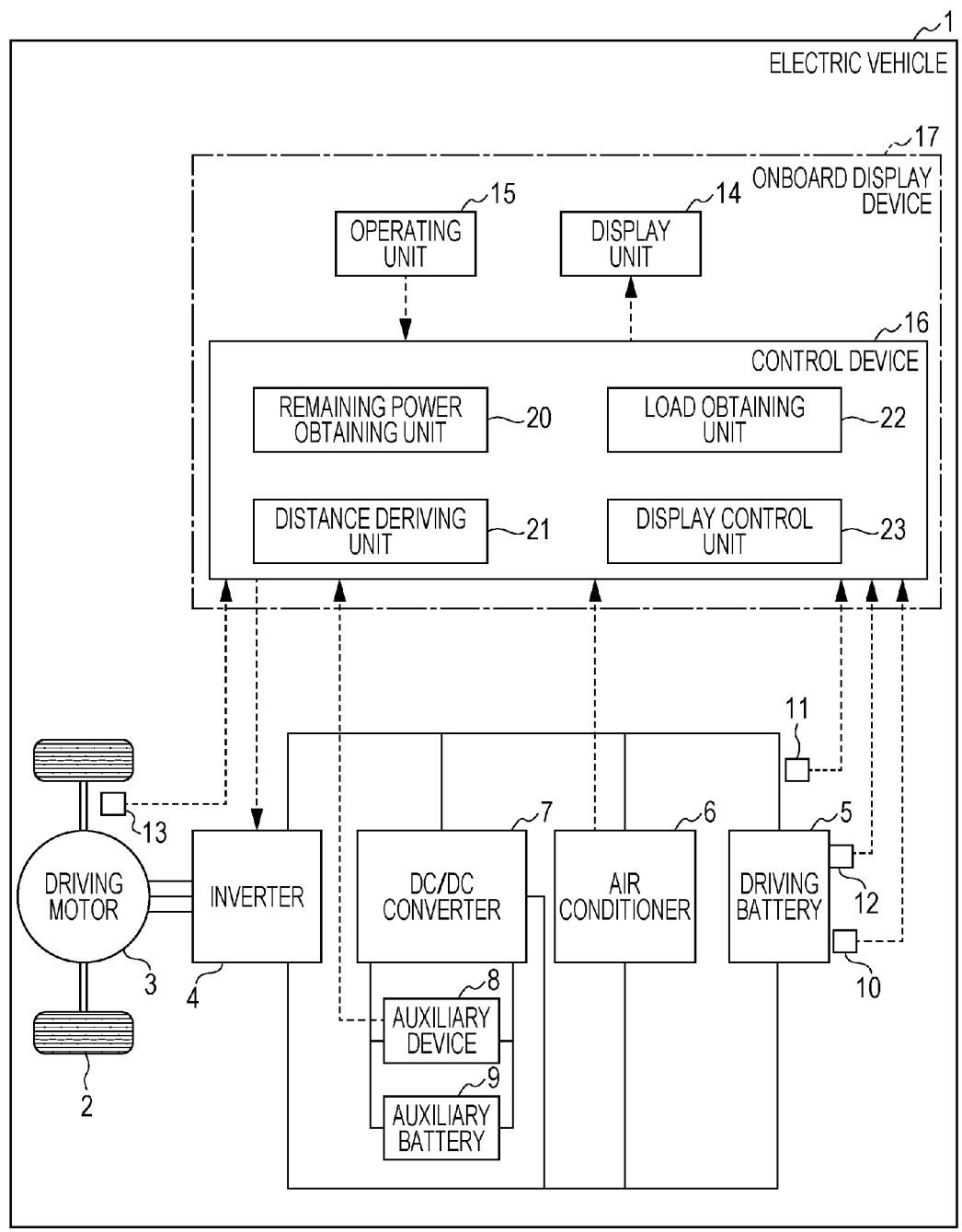
FIG. 1 is a diagram illustrating the configuration of an electric vehicle.

A preferred implementation of the present invention will be described in detail with reference to the drawings. Any dimensions materials, and other specific numerical values and so forth in the implementation are solely for illustrative purposes to facilitate understanding of the invention, and do not restrict the present invention unless specifically stated so.

Components which substantially have the same function and configuration among the drawings are denoted with the same reference numerals to avoid redundant description, and description of components which are not directly related to the present invention are omitted from illustration.

FIG. 1 is a diagram illustrating the configuration of a electric vehicle 1 (vehicle). As illustrated in FIG. 1, the electric vehicle 1 includes wheels 2 which are connected to a driving motor 3 via gears. The driving motor 3 is connected to a driving battery 5 via an inverter 4, and turns under electric power supplied from the driving battery 5. The electric vehicle 1 travels by the wheels 2 being turned by the driving motor 3.

An air conditioner 6 is also connected to the driving battery 5 in the same way as the driving motor 3, and is driven by DC power from the driving battery 5, so as to adjust the temperature and the like of air within the vehicle.

A DC/DC converter 7 is connected to the driving battery 5. The DC/DC converter 7 converts the voltage of the DC power of the driving battery 5, and supplies this to an auxiliary device 8 and an auxiliary battery 9 which is a dedicated battery for the auxiliary device 8. Note that in the present implementation, all devices which can receive electric power supply from the driving battery 5, excluding the driving motor 3, will be referred to as "accessories". Also note that in the present implementation, the term "auxiliary device 8" collectively refers to all accessories excluding the air conditioner 6.

A voltage sensor 10 detects the voltage of the driving battery 5, and outputs a signal indicating voltage to a later-described control unit 16. A current sensor 11 detects the current of the driving battery 5, and outputs a signal indicating current to the control unit 16. A temperature sensor 12 detects the temperature of the driving battery 5, and supplies a signal indicating temperature to the control unit 16.

A wheel revolutions sensor 13 is a resolver for example, which detects the number of revolutions of the wheels 2 and outputs a signal indicating revolutions to the control unit 16.

The display unit 14 is configured including a display (monitor), liquid crystal display, electroluminesce (EL) display or the like, for digital meters or a car navigation system, or the like, installed in the dashboard or the like of the electric vehicle 1, and displays images under control of a later-described display control unit 23.

An operating unit 15 is configured including operating keys, a D-pad, a touch panel overlaid on the face of a display unit 14, a remote controller, or the like, and is configured to accept operating input from passengers including the driver, and output signals indicating the contents of the operation input to the control unit 16.

The control unit 16 is configured as a microcomputer including a central processing unit (CPU), random access memory (RAM), and read only memory (ROM), and centrally control all of the parts. The control unit 16 is connected to each of the voltage sensor 10, current sensor 11, temperature sensor 12, wheel revolutions sensor 13, and operating unit 15. Signals indicating information detected at the sensors 10 through 13 and the operating unit 15 are input to the control unit 16. The control unit 16 is also connected to the inverter 4, and controls driving of the driving motor 3 via the inverter 4 based on the signals and the like input from the sensors 10 through 13 and the operating unit 15.

The display unit 14, operating unit 15, and control unit 16 make up an onboard display device 17 which derives and displays the remaining driving range. This remaining driving range is an estimated distance of how far the vehicle can travel by being driven by an electrical motor which operates under electrical power from a battery, without replenishing electric power to the driving battery 5 from outside of the electric vehicle 1 after replenishing electric power once.

The control unit 16 loads programs stored in the ROM to the RAM, executes remaining driving range derivation-and-display processing. The control unit 16 functions as a remaining power obtaining unit 20, a distance deriving unit 21, a load obtaining unit 22, and a display control unit 23. The processing performed by the function units of the control unit 16 will now be described by way of flowchart.

FIG. 2 is a flowchart illustrating the flow of the remaining driving range derivation-and-display processing. The remaining driving range derivation-and-display processing illustrated in FIG. 2 is repeatedly performed every predetermined time amount. As illustrated in FIG. 2, the remaining power obtaining unit 20 derives a state of charge (SOC) representing the remaining power amount of the driving battery 5 in percentage as to a fully charged state. The SOC is derived by current integration, voltage estimation according to open circuit voltage, and so forth, based on signals from the current sensor 11 and voltage sensor 10.

The remaining power obtaining unit 20 first multiplies the derived SOC, the average voltage of the driving battery 5 until the SOC reaches 0%, and the ampacity when the SOC is 100% (S100). The results of this multiplication indicate the remaining power. The remaining power obtaining unit 20 thus obtains the remaining power which indicates how much power is stored in the driving battery 5.

Next, the remaining power obtaining unit 20 subtracts the lower limit value of power at which a drivable state of the electric vehicle 1 can be maintained, from the remaining power, and thus derives a usable power $\alpha$ (S102).

The distance deriving unit 21 then derives a minimum remaining driving range (S104), and then further a maximum remaining driving range (S106). The remaining driving range of the electric vehicle 1 increases or decreases depending on the usage state of accessories (air conditioner 6 and auxiliary device 8). Accordingly, the distance deriving unit 21 derives a minimum remaining driving range and a maximum remaining driving range for each electric power consumption pattern by the accessories.

Specifically, the remaining driving range derived based on the remaining power, assuming that the accessories will be set to maximum load to the driving battery 5 in accordance of operation input to the accessories by the passenger, is taken as the minimum remaining driving range. This is the estimated remaining driving range with the remaining power in a case where the power load to the driving battery 5 in accordance of operation input to the accessories is the greatest within a variable range.

Also, the remaining driving range derived based on the remaining power, assuming that the accessories will be set to minimum load to the driving battery 5 in accordance of operation input to the accessories by the passenger, is taken as the maximum remaining driving range. This is the estimated remaining driving range with the remaining power in a case where the load to the driving battery 5 in accordance of operation input to the accessories is the greatest within the variable range.

Standard electric mileage of the electric vehicle 1 is set beforehand for the power load which the accessories place on the driving battery 5, for a case which is the greatest within the variable range and for a case which is the smallest within the variable range. The electric mileage in a case which the power load is the greatest will be represented by low-efficiency electric mileage x, and in a case which the power load is the smallest will be represented by high-efficiency electric mileage y. Electric mileage is the distance traveled per unit of electricity, and is measured in units of km/kWh, for example.

The remaining driving range is also influenced by the average speed, number of passengers, grade of the road, and so forth. Precision of deriving the remaining driving range can be improved by the passenger inputting setting items to identify these conditions before driving the electric vehicle 1, for example.

Figure 3A:
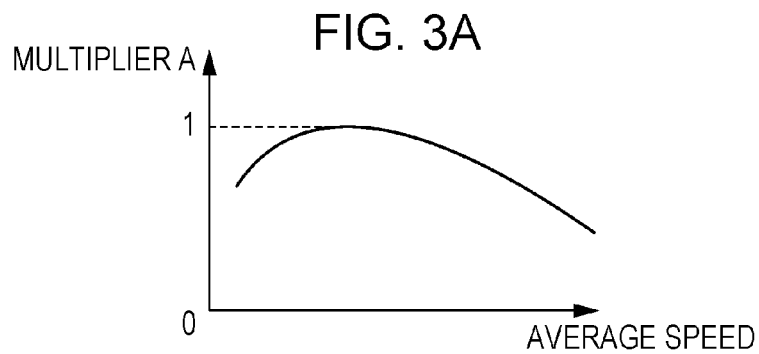
FIGS. 3A through 3C are explanatory diagrams to describe an example of correction multipliers relating to setting items.
Figure 3B:
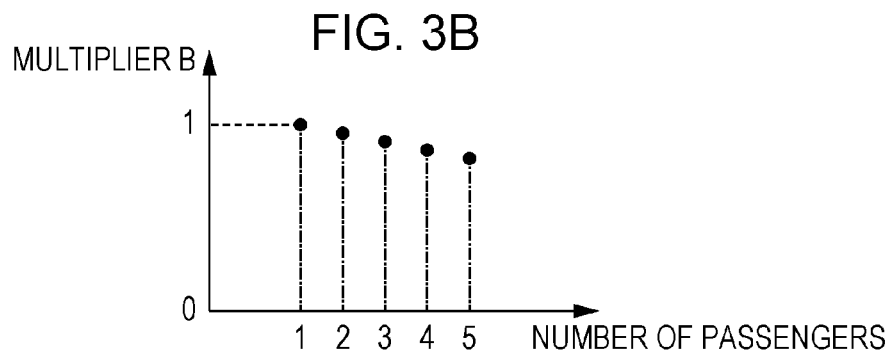
Figure 3C:
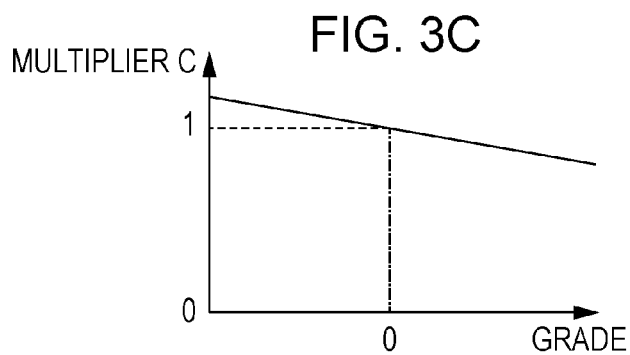

FIGS. 3A through 3C are explanatory diagrams to describe an example of correction multipliers relating to setting items. As can be seen from FIGS. 3A through 3C, a multiplier A, a multiplier B, and a multiplier C, which are correction multipliers, are identified for each of average speed, number of passengers, and grade of the road.

The multiplier A is 1 at an average speed where electric mileage is best, and progressively decreases as the average speed of the vehicle increases or decreases from this average speed. The multiplier B is 1 when the number of passengers is one, and decreases as the number of passengers increases. The multiplier C is 1 when the grade of the road is 0, which is flat, decreases below 1 when the grade is greater than 0 (uphill), and increases above 1 when the grade is smaller than 0 (downhill).

The distance deriving unit 21 multiples the usable power α, the low-efficiency electric mileage x, the multiplier A, the multiplier B, and the multiplier C, thereby calculating the minimum remaining driving range. The distance deriving unit 21 further multiples the usable power α, the high-efficiency electric mileage y, the multiplier A, the multiplier B, and the multiplier C, thereby calculating the maximum remaining driving range.

The distance deriving unit 21 also derives a remaining driving range for full charge (S108). The remaining driving range for full charge is the estimated remaining driving range on the remaining power when the driving battery 5 is fully charged and the power load is minimal.

The remaining driving range for full charge is proportionate to the capacity maintenance rate of the driving battery 5. The capacity maintenance rate is the percentage of the full-charge capacity of the driving battery 5 at the time of the most recent charge-up, as to the full-charge capacity of the driving battery 5 at the first measurement at the time of manufacturing.

The full-charge capacity is derived by dividing the integration value of current of the driving battery 5 during charging, by the difference in SOC before and after charging the driving battery 5. The driving battery 5 deteriorates overtime, and the capacity maintenance rate gradually drips, meaning that the remaining driving range for full charge is reduced.

The load obtaining unit 22 obtains load information from the driving battery 5 and the auxiliary device 8, indicating the magnitude of the electric load according to the operation input at the point-in-time (S110). Load information is information indicating the state of electric power consumption of the accessories, and includes output of the air conditioner 6, a windshield wiper speed, an operating state of defoggers which are devices to remove condensation on mirrors and windows, an on/off state of headlights, and so forth. The windshield wipers, defoggers, and headlights are examples of the auxiliary device 8. A multiplier D, a multiplier E, a multiplier F, and a multiplier G, which are correction multipliers relating to accessories, are identified for each load information.

Figure 4A:
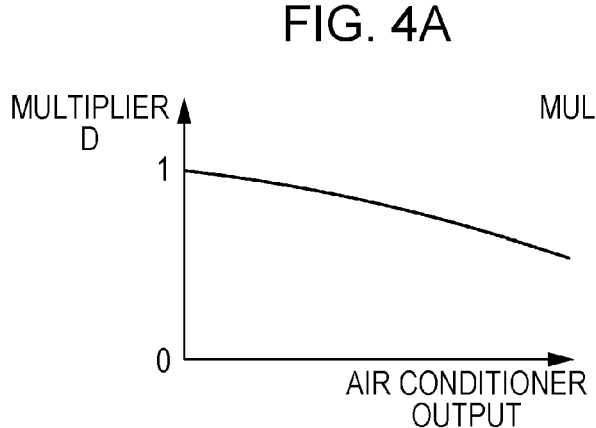
FIGS. 4A and 4B are explanatory diagrams to describe an example of correction multipliers relating to accessories.
Figure 4B:
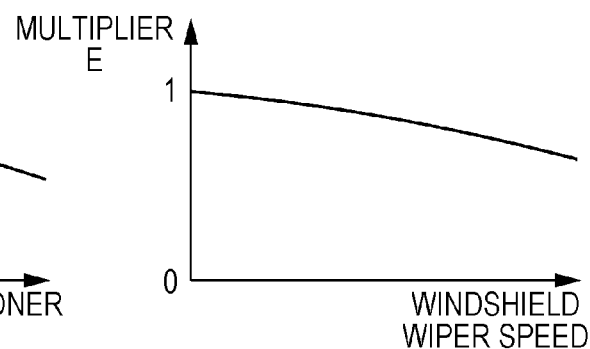

FIGS. 4A and 4B are explanatory diagrams to describe an example of correction multipliers relating to accessories. The multiplier D is 1 when the output of the air conditioner 6 is 0, and decreases as the output of the air conditioner 6 rises, as illustrated in FIG. 4A.

The multiplier E is 1 when the windshield wiper speed is 0, and decreases as the windshield wiper speed rises, as illustrated in FIG. 4B. The multiplier F, which has been omitted from illustration, is 1 when the defoggers are off, and becomes a value smaller than 1 when the defoggers are turned on. The multiplier G, which also has been omitted from illustration, is 1 when the headlights are off, and becomes a value smaller than 1 when the headlights are turned on.

The above-described low-efficiency electric mileage x is obtained by multiplying the high-efficiency electric mileage y by the smallest value of the correction multipliers relating to the accessories (multiplier D, multiplier E, multiplier F, multiplier G).

The distance deriving unit 21 calculates a momentary remaining driving range which is a remaining driving range estimated from the remaining power, at the power load indicated in the load information (S112). Specifically, the distance deriving unit 21 multiples the usable power α, the high-efficiency electric mileage y, the multiplier A, the multiplier B, the multiplier C, the multiplier D, the multiplier E, the multiplier F, and the multiplier G, thereby deriving the momentary remaining driving range.

The momentary remaining driving range is a value obtained by multiplying the maximum remaining driving range which is a remaining driving range in the state that the electric power consumption of the accessories is the smallest, by the newest value of the correction multipliers which are the multiplier D, the multiplier E, the multiplier F, and the multiplier G. This is a remaining driving range which reflects the influence of actual electric power consumption by the accessories.

Accordingly, in a case where the state of electric power consumption of the accessories changes due to an operation such as starting or stopping the windshield wipers, the influence of the electric power consumption of the accessories is immediately reflected in the momentary remaining driving range. The momentary remaining driving range is a value equal to or greater than the minimum remaining driving range, and equal to or smaller than the maximum remaining driving range.

The display control unit 23 compares the relative length of each of the remaining driving ranges (minimum remaining driving range, maximum remaining driving range, remaining driving range for full charge, and momentary remaining driving range) that have been derived, and generates image data of visually-recognizable shapes by comparing the relative length of each (S114). The display control unit 23 displays an image based on generated image data on the display unit 14 (S116), and thus ends the remaining driving range derivation-and-display processing.

FIGS. 5A through 5E are diagrams illustrating display examples of the remaining driving range. The display control unit 23 generates image data of a bar graph made up of a rectangular region H, a triangular region I, and a trapezoidal region J, as illustrated in FIGS. 5A through 5E. This image data is displayed on the display unit 14. The bar graphs illustrated here are only an example, and display may be made on the display unit 14 in any form as long as each remaining driving range is comprehendible.

In FIGS. 5A through 5E, scale marks are provided to show that the left edge of the bar graph represents remaining driving range of 0 km, and the further to the right, the longer the remaining driving range is.

Figure 5A:
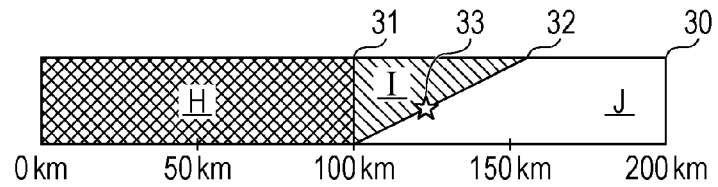
FIGS. 5A through 5E are diagrams illustrating display examples of remaining driving range.

A position 30 in FIGS. 5A through 5E at the right edge of the region J represents the remaining driving range for full charge, which is 200 km in the case of FIG. 5A. That is to say, this represents that the remaining driving range is 200 km on a fully-charged driving battery 5 if the electric power consumption by the accessories is minimal.

A position 31 at the right edge of the region H represents the minimum remaining driving range, which is 100 km in the case of FIG. 5A. That is to say, this represents that the remaining driving range is 100 km if the electric power consumption by the accessories is maximal.

A position 32 at the apex at the right edge of the region I represents the maximum remaining driving range, which is around 155 km in the case of FIG. 5A. That is to say, this represents that the remaining driving range is 155 km if the electric power consumption by the accessories is minimal.

The display control unit 23 displays the maximum remaining driving range and the minimum remaining driving range on the display unit 14 in this way. Accordingly, the passengers can easily comprehend the maximum remaining driving range and the minimum remaining driving range.

Also, the maximum remaining driving range and the minimum remaining driving range are displayed in the form of shapes, such as a bar graph which can be visually recognized by comparing the relative length. Accordingly, the effects of suppressing electric power consumption of the accessories, or reduction in remaining driving range in a case where the electric power consumption of the accessories is the greatest, can easily be visually comprehended.

The display control unit 23 also displays on the display unit 14 the remaining driving range for full charge in addition to the maximum remaining driving range and the minimum remaining driving range, as illustrated in FIGS. 5A through 5E. Accordingly, the passengers can easily comprehend the remaining driving range for full charge, in addition to the maximum remaining driving range and the minimum remaining driving range.

The maximum remaining driving range, the minimum remaining driving range, and the remaining driving range for full charge, are displayed in the form of shapes (bar graph) which can be visually recognized by comparing the relative length. Accordingly, the ratio of the maximum remaining driving range and the minimum remaining driving range as to the remaining driving range for full charge can easily be visually comprehended.

The regularity at which the maximum remaining driving range, the minimum remaining driving range, and the remaining driving range for full charge change is very infrequent, so the annoyance of the remaining driving range display frequently changing can be done away with.

A star-shaped object is situated on the straight line which is the boundary between the region I and the region J, connecting the lower edge of the position 31 indicating the minimum remaining driving range and the position 32 indicating the maximum remaining driving range. A position 33 where this object is situated indicates the momentary remaining driving range, which is around 120 km in FIG. 5A, for example. That is to say, this indicates that assuming the electric power consumption by the accessories is maintained around the same level, the remaining driving range is 120 km.

Figure 5B:
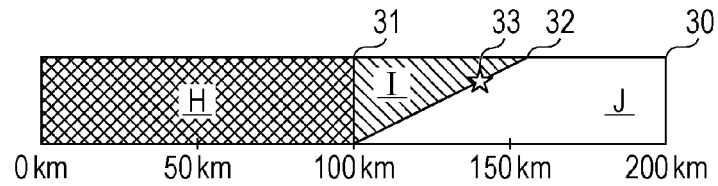

Now, for example, if the passenger changes the temperature settings of the air conditioner 6 so that the output of the air conditioner 6 is reduced, the multiplier D draws closer to 1. As a result, the momentary remaining driving range is extended, and the start-shaped object moves toward the upper right along the boundary line between the region I and the region J, as illustrated in FIG. 5B.

Figure 5C:
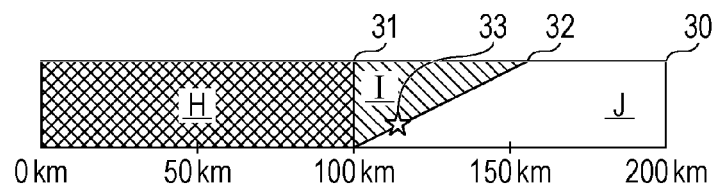

Also, for example, if it starts to rain and the passenger turns on the windshield wipers, the multiplier E becomes a value smaller than 1, in accordance with the windshield wiper speed. As a result, the momentary remaining driving range is reduced, and the start-shaped object moves toward the lower left along the boundary line between the region I and the region J, as illustrated in FIG. 5C.

Thus, the display control unit 23 also displays the momentary remaining driving range on the display unit 14 in addition to the maximum remaining driving range and the minimum remaining driving range. Accordingly, the passengers can easily comprehend the momentary remaining driving range, in addition to the maximum remaining driving range and the minimum remaining driving range.

The momentary remaining driving range is displayed as the position 33 of the star-shaped object, and the distance from the left edge of the bar graph can be compared with regard to the positions 31 and 32 corresponding to the minimum remaining driving range and the maximum remaining driving range, respectively. Accordingly, the display control unit 23 displays on the display unit 14 shapes (bar graph) which can be visually recognized by comparing the relative length for the maximum remaining driving range, the minimum remaining driving range, and the momentary remaining driving range.

Accordingly, at what position between the maximum remaining driving range and the minimum remaining driving range the momentary remaining driving range is, can easily be visually comprehended. When the electric power consumption of the accessories changes, the region H, the region I, and the region J do not change; rather, the change in electric power consumption of the accessories is reflected in the momentary remaining driving range by change in the position of the star-shaped object which is smaller than the region H, the region I, and the region J. Thus, the passengers can comprehend the momentary remaining driving range without the annoyance of the entire bar graph being changed in accordance with change in the momentary remaining driving range.

Figure 5D:
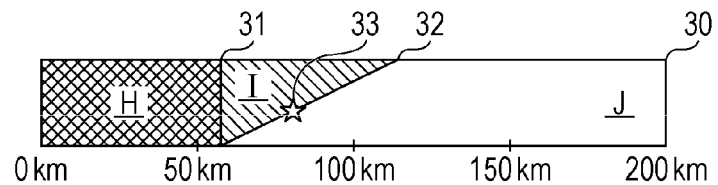

As the electric vehicle 1 is driven or the like and the remaining power in the driving battery 5 drops, the maximum remaining driving range, the minimum remaining driving range, and the momentary remaining driving range drop as illustrated in FIG. 5D.

Figure 5E:
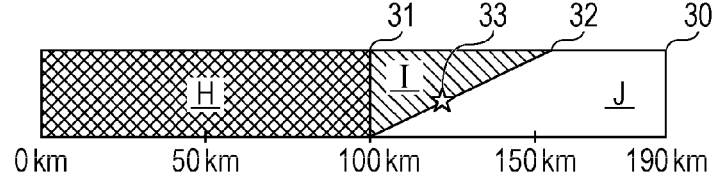

Further, as the capacity maintenance rate of the driving battery 5 drops due to deterioration over time or the like, the remaining driving range for full charge also drops. When the remaining driving range for full charge drops from 200 km to 190 km for example, the scale mark at the far right is changed from 200 km to 190 km, and the positions of the other scale marks are changed so as to be scale marks for positions from 0 km to 190 km, as illustrated in FIG. 5E. The positions 31, 32, and 33 corresponding to the maximum remaining driving range, the minimum remaining driving range, and the momentary remaining driving range are set in accordance with the scale marks, and the bar graph is redrawn.

The maximum remaining driving range, the minimum remaining driving range, and the remaining driving range for full charge, change slower than the momentary remaining driving range. This means that the change in the region H, the region I, and the region J, such as illustrated in FIG. 5D, and the change in scale marks, such as illustrated in FIG. 5E, are much more gradual that the change of the position 33 of the star-shaped object, and accordingly less annoying.

As described above, according to the onboard display device 17 of the present implementation, the annoyance of display of remaining driving range frequently changing as the electric power consumption of the accessories change can be done away with, and the desired remaining driving ranges can be easily comprehended all at once.

Figure 6A:
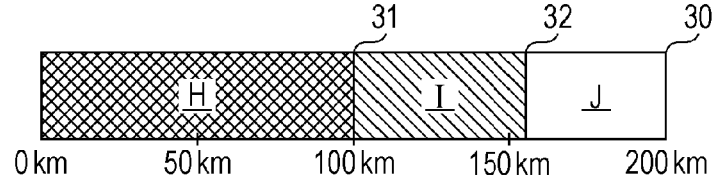
FIGS. 6A and 6B are diagrams illustrating display examples of remaining driving range according to modifications.
Figure 6B:
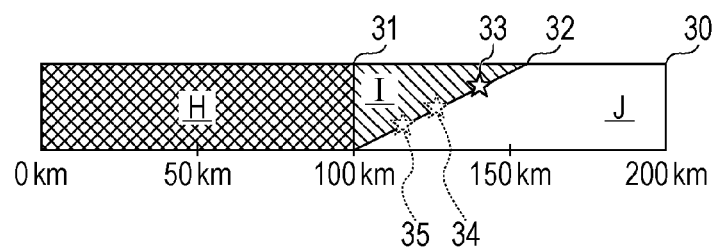

FIGS. 6A and 6B are diagrams illustrating display examples of remaining driving range according to modifications. The display control unit 23 may display only the maximum remaining driving range, the minimum remaining driving range, and the remaining driving range for full charge, on the display unit 14, without displaying the momentary remaining driving range, as illustrated in FIG. 6A. In this case, the star-shaped object is not rendered, and the bar graph does not change according to change in electrical power consumption of the accessories.

For example, if there is no need to comprehend the momentary remaining driving range, the maximum remaining driving range when suppressing the electric power consumption of the accessories, and the minimum remaining driving range when not suppressing the electric power consumption of the accessories, can be readily comprehended.

Also, an arrangement may be made such as illustrated in FIG. 6B, where multiple start-shaped objects having difference display forms are displayed on the boundary line between the region I and the region J. Of these start-shaped objects, for example, the position 33 of the start-shaped object drawn using solid lines represents the latest momentary remaining driving range, and the positions 34 and 35 of the start-shaped objects illustrated with dotted lines represent the history of past momentary remaining driving ranges.

The longer the momentary remaining driving range is maintained at around the same value relative to others in the history of past momentary remaining driving ranges, the darker the color of the start-shaped object corresponding to that momentary remaining driving range becomes. If the momentary remaining driving range is only maintained a short time at around the same value relative to others in the history of past momentary remaining driving ranges, the color of the start-shaped object corresponding to that momentary remaining driving range is light. That is to say, the longer the momentary remaining driving range is maintained at around this value, the darker the color of the start-shaped object becomes.

Thus, placing multiple star-shaped objects allows the history of past momentary remaining driving ranges to be comprehended from the positions 34 and 35 of the star-shaped objects. Moreover, the darkness of the color of the multiple star-shaped objects allows the relation of duration of periods over which the momentary remaining driving ranges corresponding to the respective positions 34 and 35 had been derived to be easily comprehended.

While a preferred implementation of the present invention has been described with reference to the attached drawings, it is needless to say that the present invention is not restricted to this implementation. It is clearly understood that one of ordinary skill in the art could arrive at various modifications and alterations without departing from the scope of the aspects. Such are to be understood to belong to the technical scope of the present invention as a matter of course.

For example, description has been made in the above-described implementation and modifications where the remaining driving range for full charge is derived and display, but derivation and display of the remaining driving range for full charge is not indispensible.

Also for example, description has been made in the above-described implementation and modifications where the remaining driving ranges are display using shapes such as a bar graph, but one or more of the remaining driving ranges may be displayed by text such as numbers, without using shapes.

Further, for example, description has been made in the above-described implementation and modifications where the load obtaining unit 22 obtains load information indicating the magnitude of power load in accordance with operation input at that point-in-time, from the driving battery 5 and auxiliary device 8, and the distance deriving unit 21 derives the momentary remaining driving range by multiplying by correction multipliers identified in accordance to the load information. However, an arrangement may be made where the load obtaining unit 22 uses signals from the voltage sensor 10 and current sensor 11 as load information. In this case, the load obtaining unit 22 derives the power per time unit being output from the driving battery 5 based on these two signals. The distance deriving unit 21 then divides the distance traveled per time unit by the power per time unit to derive a momentary electric mileage z, and derives the momentary remaining driving range by multiplying the usable power α, momentary electric mileage z, multiplier A, multiplier B, and multiplier C.

The present invention is applicable to an onboard display device which derives and displays a remaining driving range which is an estimation of how far a vehicle can travel on the remaining electric power in the battery.

The invention claimed is:

1. An onboard display device that displays, on a display unit within a vehicle, a remaining driving range, which is an estimated distance of how far the vehicle can travel by being driven by an electrical motor which operates under electrical power from a battery, without replenishing electric power to the battery from outside of the vehicle, the onboard display device comprising:
    a remaining power obtaining unit that obtains remaining power which is electric power stored in the battery;
    a distance deriving unit that derives
        a minimum remaining driving range estimated to be the distance which the vehicle can travel on the remaining battery power, in a case where a power load which accessories capable of receiving electric power from the battery place on the battery is the greatest within a variable range in accordance with input of operations, and
        a maximum remaining driving range estimated to be the distance which the vehicle can travel on the remaining battery power, in a case where the power load is the smallest within the variable range; and
    a display control unit that displays the minimum remaining driving range and the maximum remaining driving range on the display unit.

2. The onboard display device according to claim 1, wherein the display control unit displays each of the maximum remaining driving range and the minimum remaining driving range on the display unit in the form of shapes which are visually recognizable by comparing relative length thereof.

3. The onboard display device according to claim 2, wherein
    the distance deriving unit derives a remaining driving range for full charge estimated to be the distance which the vehicle can travel on the remaining power when the battery is fully charged and power load is minimal; and
    the display control unit further displays the remaining driving range for full charge on the display unit.

4. The onboard display device according to claim 3, further comprising:
   a load obtaining unit to obtain load information that indicates magnitude of the power load according to operation input at that point-in-time, wherein
   the distance deriving unit derives a momentary remaining driving range estimated to be the distance which the vehicle can travel on the remaining power under the power load indicated by the load information; and
   the display control unit further displays the momentary remaining driving range on the display unit.

5. The onboard display device according to claim 2, further comprising:
   a load obtaining unit to obtain load information that indicates magnitude of the power load according to operation input at that point-in-time, wherein
   the distance deriving unit derives a momentary remaining driving range estimated to be the distance which the vehicle can travel on the remaining power under the power load indicated by the load information; and
   the display control unit further displays the momentary remaining driving range on the display unit.

6. The onboard display device according to claim 1, wherein
   the distance deriving unit derives a remaining driving range for full charge estimated to be the distance which the vehicle can travel on the remaining power when the battery is fully charged and power load is minimal; and
   the display control unit further displays the remaining driving range for full charge on the display unit.

7. The onboard display device according to claim 6, further comprising:
   a load obtaining unit to obtain load information that indicates magnitude of the power load according to operation input at that point-in-time, wherein
   the distance deriving unit derives a momentary remaining driving range estimated to be the distance which the vehicle can travel on the remaining power under the power load indicated by the load information; and
   the display control unit further displays the momentary remaining driving range on the display unit.

8. The onboard display device according to claim 1, further comprising:
   a load obtaining unit to obtain load information that indicates magnitude of the power load according to operation input at that point-in-time, wherein
   the distance deriving unit derives a momentary remaining driving range estimated to be the distance which the vehicle can travel on the remaining power under the power load indicated by the load information; and
   the display control unit further displays the momentary remaining driving range on the display unit.

* * * * *